(12) United States Patent
Liu et al.

(10) Patent No.: US 9,444,983 B2
(45) Date of Patent: Sep. 13, 2016

(54) PHOTOGRAPHING DEVICE

(71) Applicant: VIVOTEK INC., New Taipei (TW)

(72) Inventors: Yui-Juin Liu, New Taipei (TW); Chih-Chieh Chan, New Taipei (TW)

(73) Assignee: VIVOTEK INC., New Taipei (TW)

( * ) Notice: Subject to any disclaimer, the term of this patent is extended or adjusted under 35 U.S.C. 154(b) by 89 days.

(21) Appl. No.: 14/479,797

(22) Filed: Sep. 8, 2014

(65) Prior Publication Data

US 2015/0103237 A1 Apr. 16, 2015

(30) Foreign Application Priority Data

Oct. 11, 2013 (TW) .............................. 102136865 A

(51) Int. Cl.
| | |
|---|---|
| H04N 5/225 | (2006.01) |
| G06F 1/16 | (2006.01) |
| G08B 13/196 | (2006.01) |
| H04M 1/02 | (2006.01) |

(52) U.S. Cl.
CPC .......... *H04N 5/2252* (2013.01); *G06F 1/1605* (2013.01); *G06F 1/1696* (2013.01); *G08B 13/19632* (2013.01); *H04M 1/0264* (2013.01); *H04N 5/2257* (2013.01)

(58) Field of Classification Search
None
See application file for complete search history.

(56) References Cited

U.S. PATENT DOCUMENTS

| | | | | |
|---|---|---|---|---|
| 6,357,936 B1* | 3/2002 | Elberbaum | ............ | G03B 37/02 206/316.2 |
| 6,476,856 B1* | 11/2002 | Zantos | ............. | G08B 13/19619 348/143 |
| 6,678,001 B1* | 1/2004 | Elberbaum | ...... | G08B 13/19619 348/373 |
| 6,721,501 B2* | 4/2004 | Komatsu | ................ | B60R 11/04 348/143 |

* cited by examiner

*Primary Examiner* — Mark Monk
(74) *Attorney, Agent, or Firm* — Tim Tingkang Xia, Esq.; Locke Lord LLP

(57) ABSTRACT

A photographing device comprises an assembling component, an image capturing component, a first annular fastener, a first stopping part and a second annular fastener. The assembling component comprises a hollow case, a protruding part, a first fastening part and a second fastening part. The hollow case has an inner surface, a first end and a second end. The protruding part is located at inner surface to form a supporting space together. The first fastening part and second fastening part are located at first end and second end, respectively. The image capturing component is located in supporting space. The first annular fastener has a third fastening part fastened to first fastening part and an annular abutting part. The first stopping part is connected to first annular fastener or first end. The second annular fastener has a fourth fastening part fastened to second fastening part and a second stopping part.

13 Claims, 9 Drawing Sheets

PHOTOGRAPHING DEVICE

CROSS-REFERENCE TO RELATED APPLICATIONS

This non-provisional application claims priority under 35 U.S.C. §119(a) on Patent Application No(s).102136865 filed in Taiwan, R.O.C. on Oct. 11, 2013, the entire contents of which are hereby incorporated by reference.

TECHNICAL FIELD

The disclosure relates to a photographing device, more particular to an eye-typed photographing device.

BACKGROUND

Since the surveillance technology is able to monitor and record the behavior, activities, or other changing information, it can effectively substitute for security guards. The surveillance technology can also combine optical character recognition (BCR) and alarm system to provide an alarm signal when a certain monitored environment is abnormal. Therefore, the surveillance technology has become a main stream of passive security system.

The most important equipment in the surveillance technology is Internet Protocol camera (IP camera). The IP cameras can be divided into outdoor IP cameras and indoor IP cameras based on where they are installed. The outdoor IP cameras are easily to be vandalized so that the invisibility and anti-explosiveness of the outdoor IP cameras need to be improved. Accordingly, the outdoor IP cameras are usually installed in a hidden location, but it is more difficult to assemble the cameras. Therefore, it is necessary to improve the invisibility, the anti-explosiveness and the assembling efficiency of the IP cameras.

SUMMARY

According to the disclosure, a photographing device comprises an assembling component, an image capturing component, a first annular fastener, a first stopping part and a second annular fastener. The assembling component comprises a hollow case, a protruding part, a first fastening part and a second fastening part. The hollow case has an inner surface, a first end and a second end. The first end and the second end are opposite to each other. The protruding part is located at the inner surface so that the protruding part and the inner surface form a supporting space together. The first fastening part is located at the first end of the hollow case. The second fastening part is located at the second end of the hollow case. The image capturing component is located in the supporting space. The first annular fastener has a third fastening part and an annular abutting part. The first annular fastener is detachably fastened to the first fastening part via the third fastening part. The image capturing component is at least partially interposed between the annular abutting part and the protruding part. The first stopping part is connected to the first annular fastener or the first end of the hollow case. The second annular fastener has a fourth fastening part and a second stopping part. The second annular fastener is detachably fastened to the second fastening part via the fourth fastening part so as to adjust a space between the first stopping part and the second stopping part.

BRIEF DESCRIPTION OF THE DRAWINGS

The present disclosure will become more fully understood from the detailed description given herein below, along with the accompanying drawings which are for illustration only, thus are not limitative of the present disclosure, and wherein.

DETAILED DESCRIPTION

Figure 1:
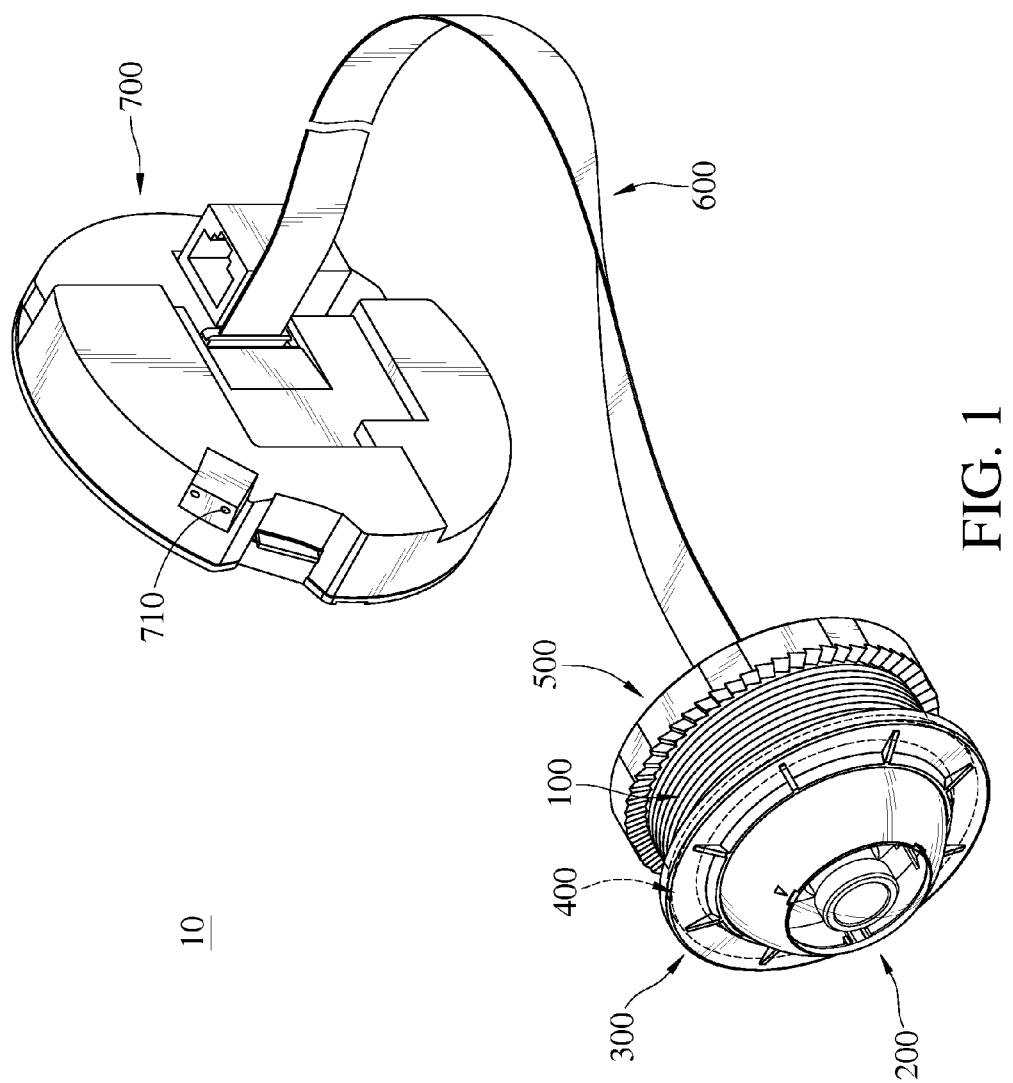
FIG. 1 is a perspective view of a photographing device according to a first embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
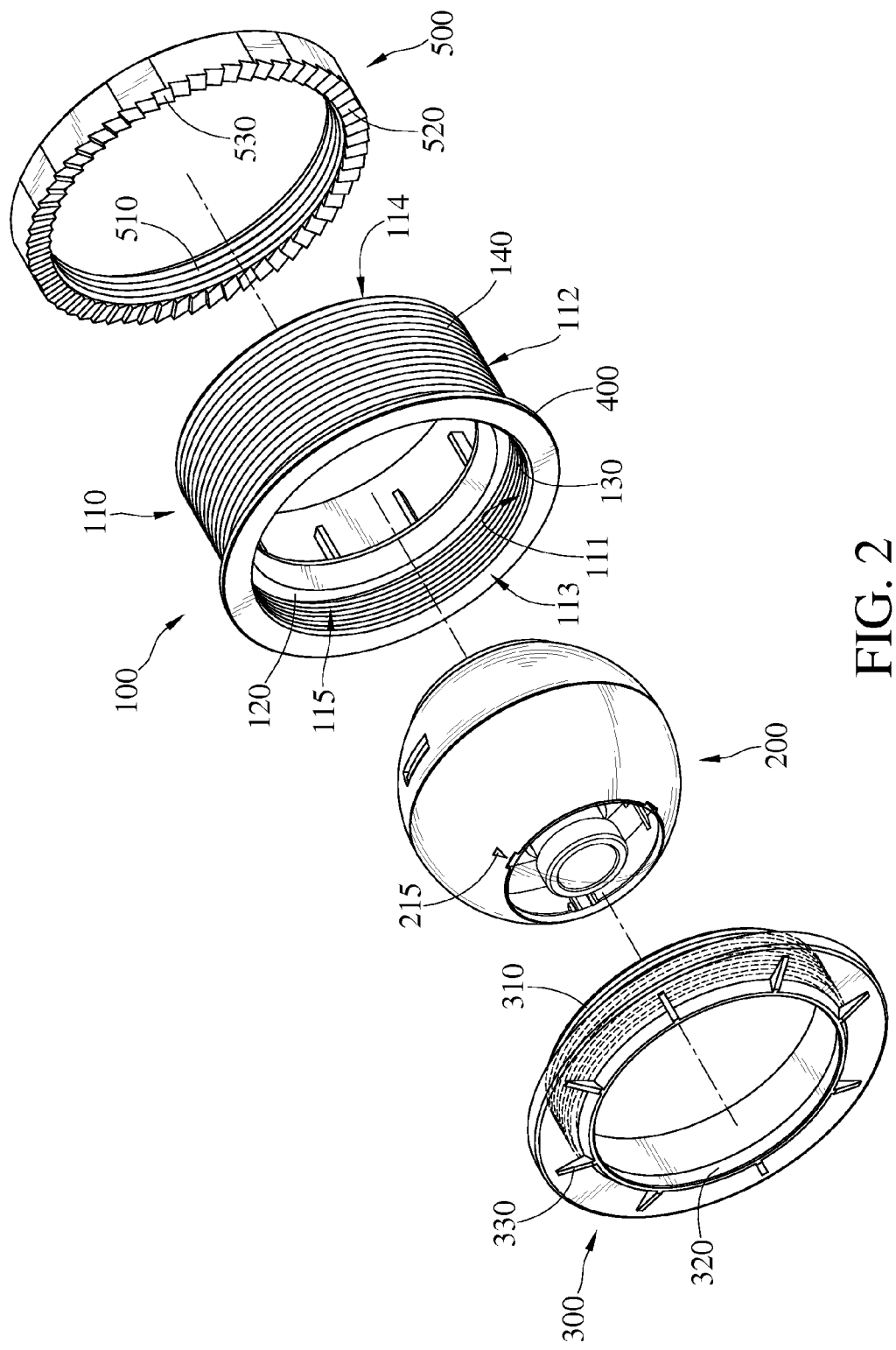
FIG. 2 is an explosive view of the photographing device in FIG. 1.
Figure 3:
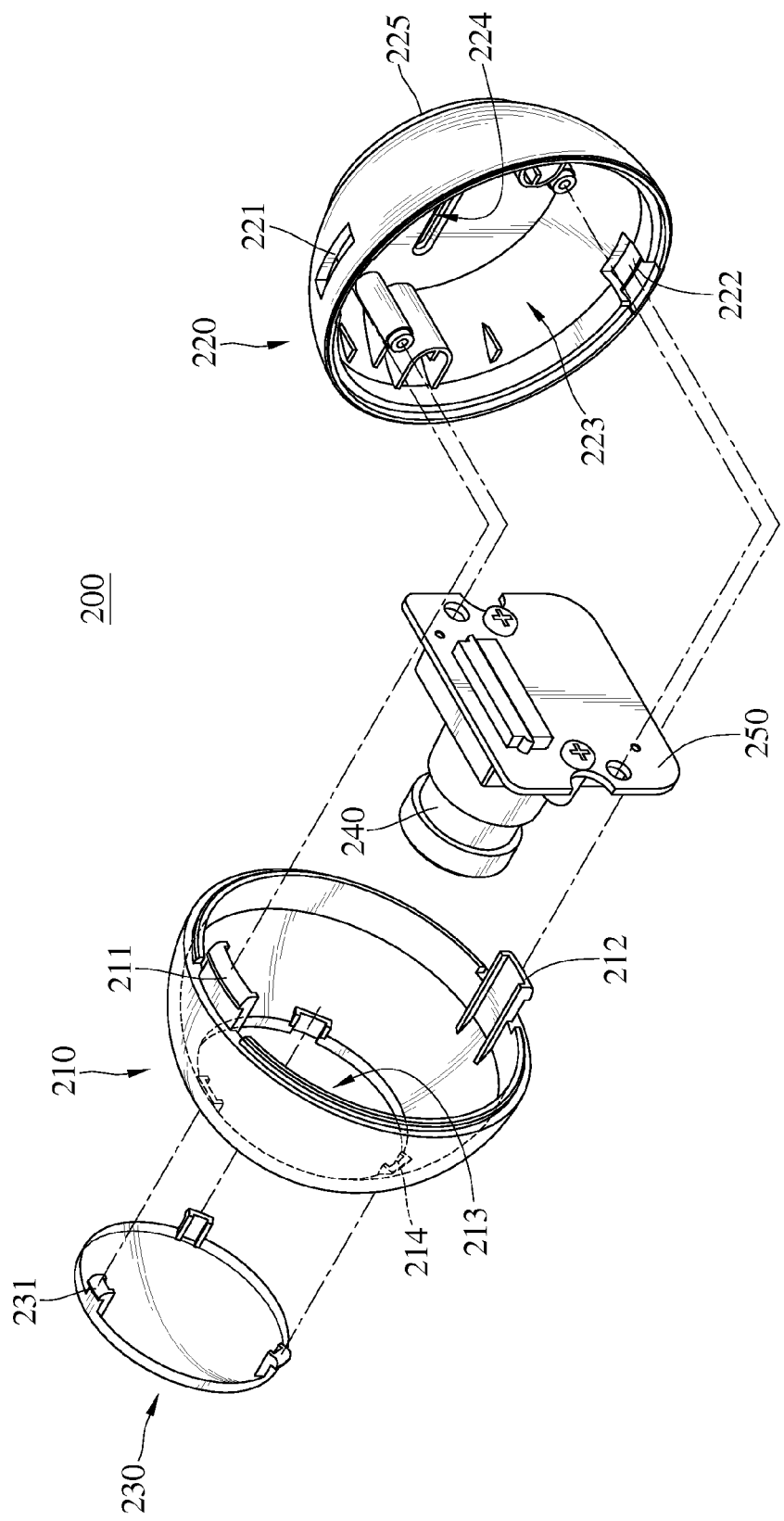
FIG. 3 is an explosive view of an image capturing component in FIG. 2.

Please refer to FIG. 1, FIG. 2 and FIG. 3. FIG. 1 is a perspective view of a photographing device according to a first embodiment. FIG. 2 is an explosive view of the photographing device in FIG. 1. FIG. 3 is an explosive view of an image capturing component in FIG. 2. In this embodiment, a photographing device 10 comprises an assembling component 100, an image capturing component 200, a first annular fastener 300, a first stopping part 400, a second annular fastener 500, a flexible transmission cable 600 and a camera body 700.

The assembling component 100 comprises a hollow case 110, a protruding part 120, a first fastening part 130 and a second fastening part 140. The hollow case 110 is, for example, a hollow tube. The hollow case 110 has an inner surface 111 and an outer surface 112 opposite to each other, and a first end 113 and a second end 114 opposite to each other. The protruding part 120 is located at and protrudes from the inner surface 111 so that the protruding part 120 and the inner surface 111 form a supporting space 115 together. The first fastening part 130 is located at the inner surface 111 and is located between the first end 113 and the protruding part 120. The second fastening part 140 is located at the outer surface 112 and is located between the first end 113 and the second end 114. Both of the first fastening part 130 and the second fastening part 140, for example, have screw thread. The first fastening part 130 extends from the first end 113 and extends toward to the second end 114, and the second fastening part 140 extends from the second end 114 and extends toward to the first end 113.

The image capturing component 200 is located in the supporting space 115. The shape of the image capturing component 200 is spherical so as to be able to rotate relative to the hollow case 110. The image capturing component 200 comprises a first cover 210, a second cover 220, a light-transmissive lid 230, a lens 240 and an image sensor 250.

The first cover 210 has a first assembling part 211, a third assembling part 212, a hole 213, three fifth assembling parts 214 and an alignment mark 215. The first assembling part 211 and the third assembling part 212 are located at opposite two sides of the first cover 210, respectively. The three fifth assembling parts 214 are located at the vicinity of the hole 213. The alignment mark 215 is located at an outer surface of the first cover 210 for the purpose of locating the image capturing component 200 in the supporting space 115 in correct orientation.

The second cover 220 has a second assembling part 221, a fourth assembling part 222 and a limiting part 225. The second assembling part 221 and the fourth assembling part 222 are located at opposite two sides of the second cover 220, respectively. The first assembling part 211 and the third assembling part 212 are detachably assembled to the second assembling part 221 and the fourth assembling part 222, respectively. When the image capturing component 200 is located in the supporting space 115, the protruding part 120 surrounds the limiting part 225. The limiting part 225 is configured for being pressed against the protruding part 120 so as to restrict a rotating angle of the image capturing component 200. The second cover 220 further has an opening 224.

In this embodiment, a size of the first assembling part 211 is greater than that of the third assembling part 212. A size of the second assembling part 221 matches that of the first assembling part 211, and a size of the fourth assembling part 222 matches that of the third assembling part 212. Since the size of first assembling part 211 and that of the third assembling part 212 are different, it is favorable for preventing a user from assembling the photographing device 10 incorrectly so as to have anti-fooling capability. Moreover, the aforementioned assembling parts can be combined by, for example, screwing or hooking or magnet. In this embodiment, the aforementioned assembling parts are combined by hooking.

The light-transmissive lid 230 has three sixth assembling parts 231. Each of the three sixth assembling parts 231 are detachably assembled to the three fifth assembling parts 214, respectively, so that the light-transmissive lid 230, the first cover 210 and the second cover 220 form an accommodation space 223 together. The accommodation space 223 is connected to the hole 213 and the opening 224, respectively. In this embodiment, the number of the fifth assembling part 214 and that of the sixth assembling part 231 are both three, but the disclosure is not limited thereto. In some other embodiments, the number of the fifth assembling part 214 and that of the sixth assembling part 231 can be one or more than one.

The lens 240 is electrically connected to the image sensor 250. Both of the lens 240 and the image sensor 250 are located in the accommodation space 223. A portion of the lens 240 which captures images is aligned to the light-transmissive lid 230.

Figure 4A:
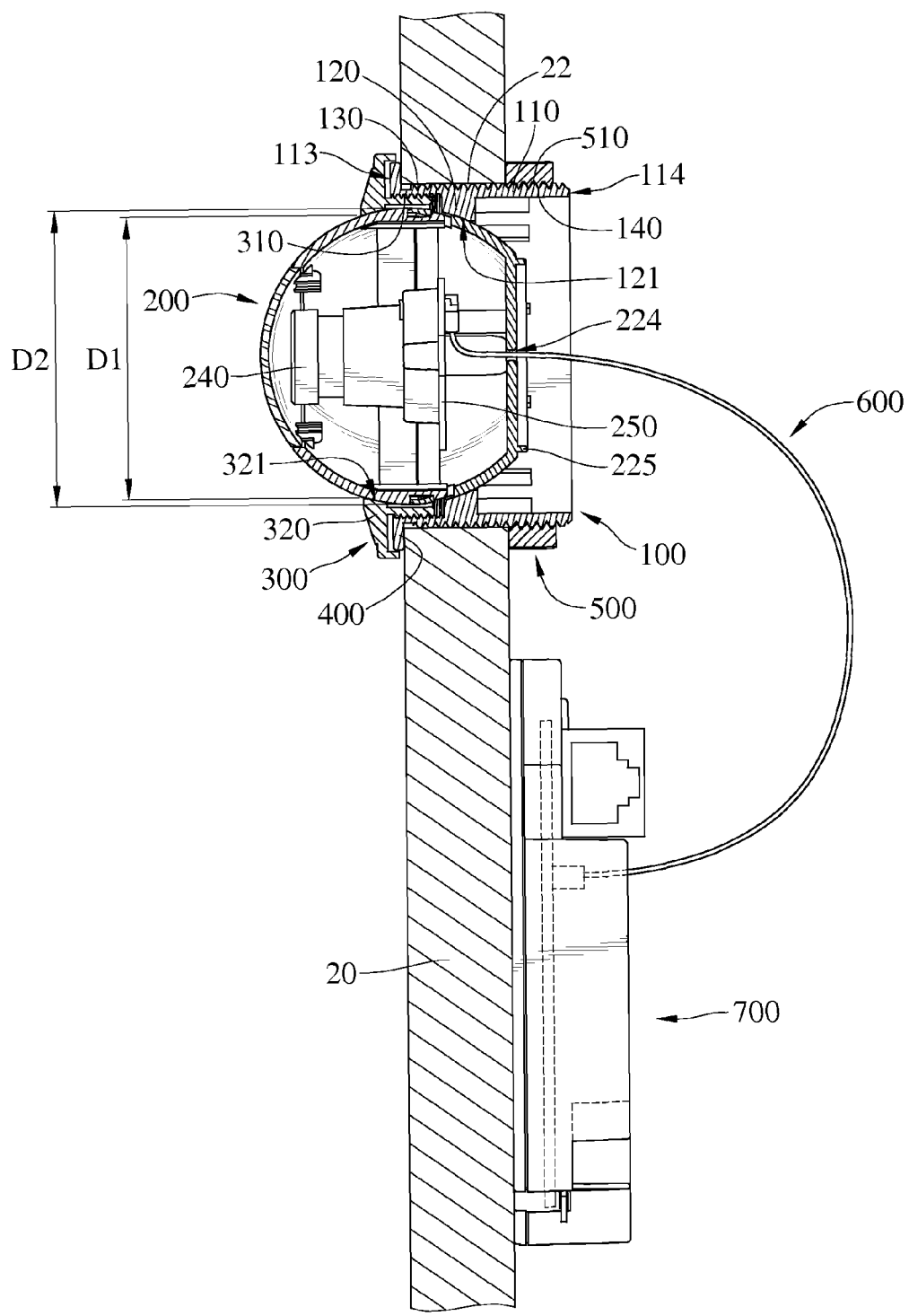
FIG. 4A is a cross-sectional view of the photographing device installed on a rack according to the first embodiment.

The first annular fastener 300 has a third fastening part 310, an annular abutting part 320 and a plurality of ribs 330. The third fastening part 310, for example, has screw thread. The third fastening part 310 is detachably screwed to the first fastening part 130 so as to fasten the first annular fastener 300 to the hollow case 110. An inner diameter D1 of the annular abutting part 320 is less than a diameter D2 of the image capturing component 200 (as shown in FIG. 4A) so that the image capturing component 200 is at least partially interposed between the annular abutting part 320 and the protruding part 120. The ribs 330 and the third fastening part 310 are located at opposite two sides of the first annular fastener 300, respectively, so as to lock and loose the first annular fastener 300 more conveniently. In this embodiment, the first fastening part 130 is fastened to the third fastening part 310 by the screw thread, but the disclosure is not limited thereto. In some other embodiments, the first fastening part 130 and the third fastening part 310 can be a hook and a corresponding notch, respectively.

The first stopping part 400 is connected to the first end 113 of the hollow case 110.

The second annular fastener 500 has a fourth fastening part 510 and a second stopping part 520. The fourth fastening part 510, for example, has screw thread. The fourth fastening part 510 is detachably screwed to the second fastening part 140 so as to fasten the second annular fastener 500 to the hollow case 110. The fourth fastening part 510 is able to be locked or loosed to adjust a distance between the first stopping part 400 and the second stopping part 520. Furthermore, the second stopping part 520 has a sawtooth structure 530 facing towards the first stopping part 400 so as to strongly fix the photographing device 10 on a rack 20 (as shown in FIG. 4A).

The flexible transmission cable 600 passes through the opening 224. The two opposite ends of the flexible transmission cable 600 are electrically connected to the image sensor 250 and the camera body 700, respectively. The flexible transmission cable 600 is, for example but not limited thereto, a flex flat cable (FFC). The camera body 700 comprises a plurality of electric components (not shown in the drawings) except the lens 240 and the image sensor 250. For example, the camera body 700 can comprises an image processing module, an image compressing module and a network transmission module. The camera body 700 can have an illuminating part 710 configured for a light source.

Figure 4B:
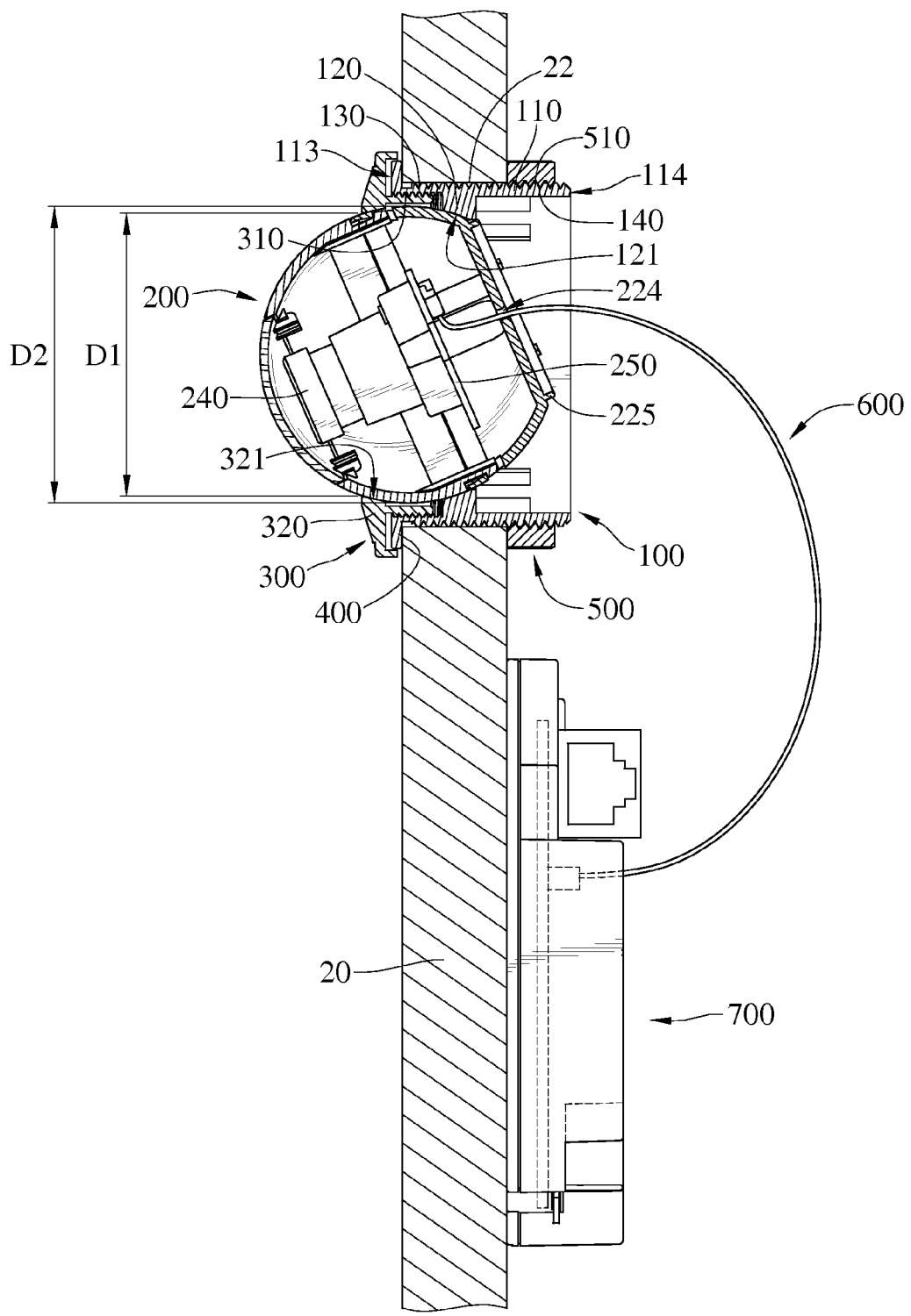
FIG. 4B is a cross-sectional view of the photographing device in FIG. 4A when the photographing device rotates through an angle.

Please refer to FIG. 4A and FIG. 4B. FIG. 4A is a cross-sectional view of the photographing device installed on a rack according to the first embodiment. FIG. 4B is a cross-sectional view of the photographing device in FIG. 4A when the photographing device 10 rotates an angle. In this embodiment, the photographing device 10 is installed on a rack 20 having an orifice 22. The following describes the steps of installing the photographing device 10 on the rack 20.

First, the second end 114 of the hollow case 110 passes through the orifice 22 of the rack 20. Second, the second annular fastener 500 is screwed to the hollow case 110 so that the rack 20 is interposed between the first stopping part 400 and the second stopping part 520 so as to fix the hollow case 110 to the rack 20. Third, the first annular fastener 300 is screwed to the hollow case 110 so as to locate the image capturing component 200 in the supporting space 115 of the hollow case 110. Fourth, the first annular fastener 300 is rotated to be locked to the hollow case 110.

Specifically, before the first annular fastener 300 is not completely locked to the hollow case 110, the image capturing component 200 is able to rotate relative to the hollow case 110 so as to adjust the image-capturing angle of the image capturing component 200 (as shown in FIG. 4B). When the image-capturing angle of the image capturing component 200 is adjusted, the limiting part 225 interferes with the protruding part 120 to prevent the lens 240 from being covered by the first annular fastener 300 and the hollow case 110. When the image capturing component 200 rotates, the alignment mark 215 is configured to make sure the image capturing component 200 in a correct orientation so as to ensure that the image captured by the lens 240 is correct rather than up-side-down. After the image capturing component 200 is located in the supporting space 115, opposite two sides of the image capturing component 200 is pressed against a supporting surface 121 of the protruding part 120 and a touching surface 321 of the annular abutting part 320, respectively. Since the shape of the image capturing component 200 is spherical, the supporting surface 121 and the touching surface 321 can be curved so that it is favorable for rotating the image capturing component 200 relative to the hollow case 110 to adjust the image-capturing angle of the image capturing component 200. Furthermore, the camera body 700 can be fixed to a position of the rack 20 having better invisibility and better anti-explosiveness by a screw or a nail.

In this embodiment, the image capturing component 200 is located in the supporting space 115 after the hollow case 110 passes through the orifice 22 of the rack 20, but the disclosure is not limited thereto. In some other embodiments, the image capturing component 200 can be located in the supporting space 115 before the hollow case 110 passes through the orifice 22.

According to the aforementioned configurations and installation steps of the photographing device 10, a user is able to assemble the image capturing component 200 to the hollow case 110 conveniently, and the photographing device 10 is able to be installed on the rack 20 no matter the thickness of the rack 20 is by fastening the first annular fastener 300 and the second annular fastener 500 to the hollow case 110. Therefore, it is favorable for efficiently assembling the photographing device 10.

Furthermore, the lens 240 and the image sensor 250 are both separated from the camera body 700 so as to miniaturize the image capturing component 200 to decrease the volume of the photographing device 10 exposed to outside, thereby improving the invisibility and the anti-explosiveness of the photographing device 10.

Moreover, the image capturing component 200 is miniaturized and the orifice 22 of the rack 20 veils the photographing device 10, thereby further improving the invisibility and the anti-explosiveness of the photographing device 10.

Figure 5:
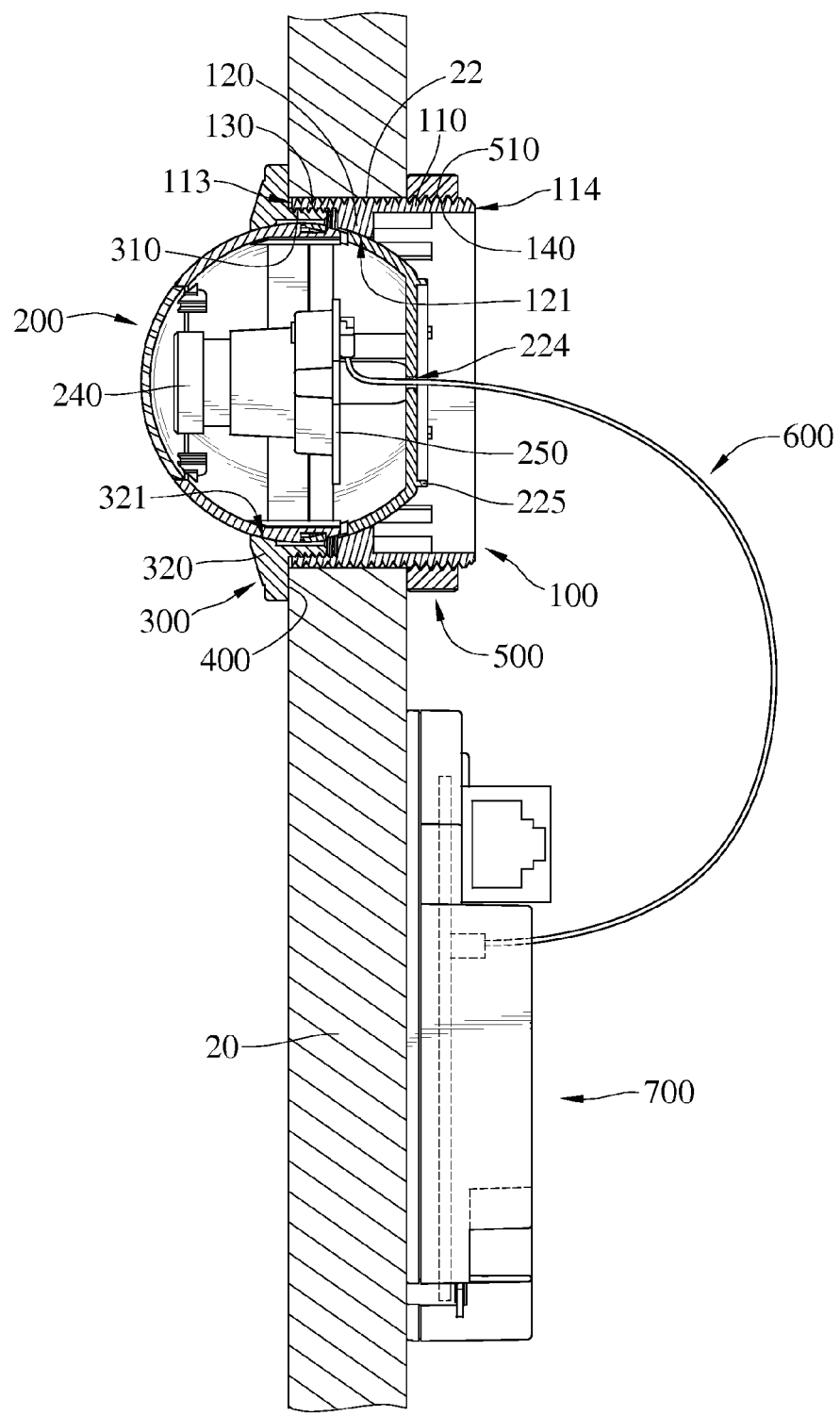
FIG. 5 is a cross-sectional view of a photographing device installed on a rack according to a second embodiment.

Please refer to FIG. 5, which is a cross-sectional view of a photographing device installed on a rack according to a second embodiment. Since this embodiment is similar to the first embodiment, only the differences will be illustrated hereafter. In this embodiment, a first stopping part 400 is connected to a first annular fastener 300 instead of being connected to a first end 113 of a hollow case 110. The following describes the steps of installing a photographing device 10 on a rack 20.

First, a second end 114 of the hollow case 110 passes through an orifice 22 of the rack 20. Second, the first annular fastener 300 is screwed to the hollow case 110 so as to locate an image capturing component 200 in a supporting space 115 of the hollow case 110. Third, a second annular fastener 500 is screwed to the hollow case 110. Fourth, the second annular fastener 500 is locked to the hollow case 110 so that the rack 20 is interposed between the first stopping part 400 of the first annular fastener 300 and a second stopping part 520 of the second annular fastener 500 so as to fix the photographing device 10 to the rack.

In this embodiment, the second annular fastener 500 is screwed to the hollow case 110 after the first annular fastener 300 is screwed to the hollow case 110, but the disclosure is not limited thereto. In some other embodiments, the second annular fastener 500 is screwed to the hollow case 110 before the first annular fastener 300 is screwed to the hollow case 110. After the first annular fastener 300 is screwed to the hollow case 110, the second annular fastener 500 is locked to the hollow case 110.

Figure 6:
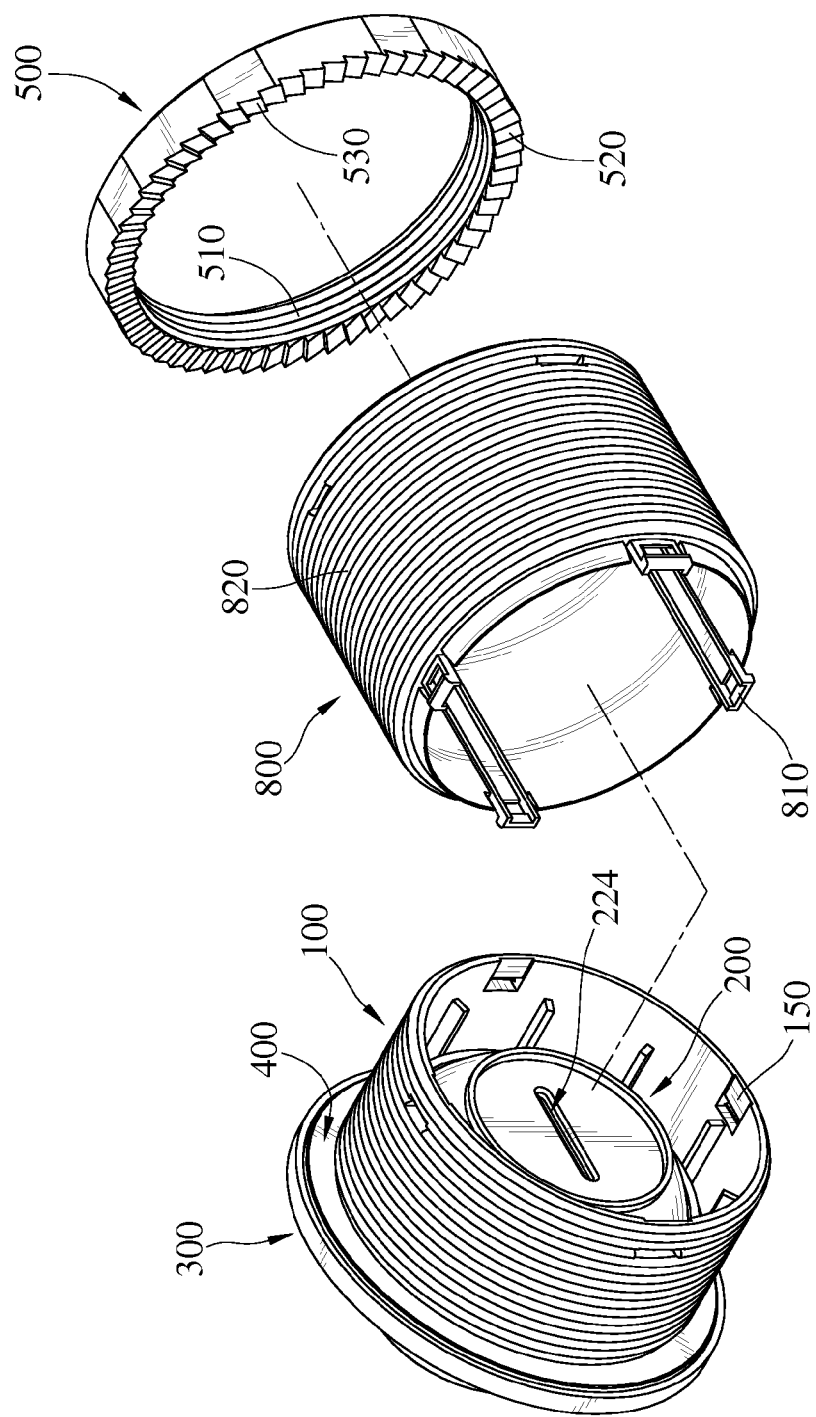
FIG. 6 is an explosive view of a photographing device according to a third embodiment.
Figure 7:
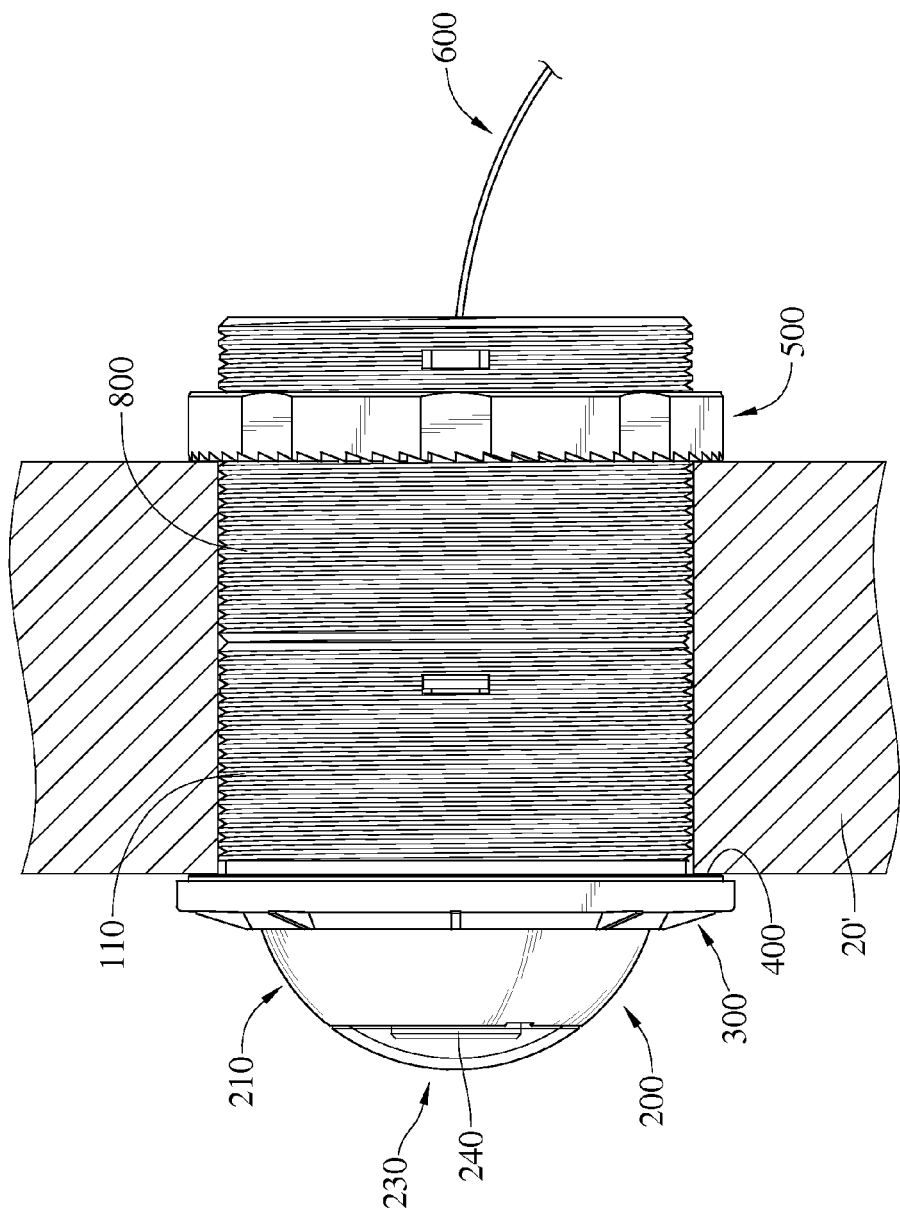
FIG. 7 is a cross-sectional view of the photographing device according to the third embodiment.

Please refer to FIG. 6 an FIG. 7. FIG. 6 is an explosive view of a photographing device according to a third embodiment. FIG. 7 is a cross-sectional view of the photographing device according to the third embodiment. Since this embodiment is similar to the first embodiment, only the differences will be illustrated hereafter. In this embodiment, the photographing device 10 further comprises an expansion component 800.

The expansion component 800 comprises a seventh assembling part 810 and a fifth fastening part 820 connected to each other. A hollow case 110 further has an eighth assembling part 150 located at a second end 114 of the hollow case 110. The seventh assembling part 810 is detachably fastened to the eighth assembling part 150 so that the fifth fastening part 820 is connected to a second fastening part 140 of an assembling component 100 so as to extend a length of the assembling component 100. Therefore, the photographing device 10 is able to fixed to a thicker rack 20' via the expansion component 800 (as shown in FIG. 7).

Figure 8:
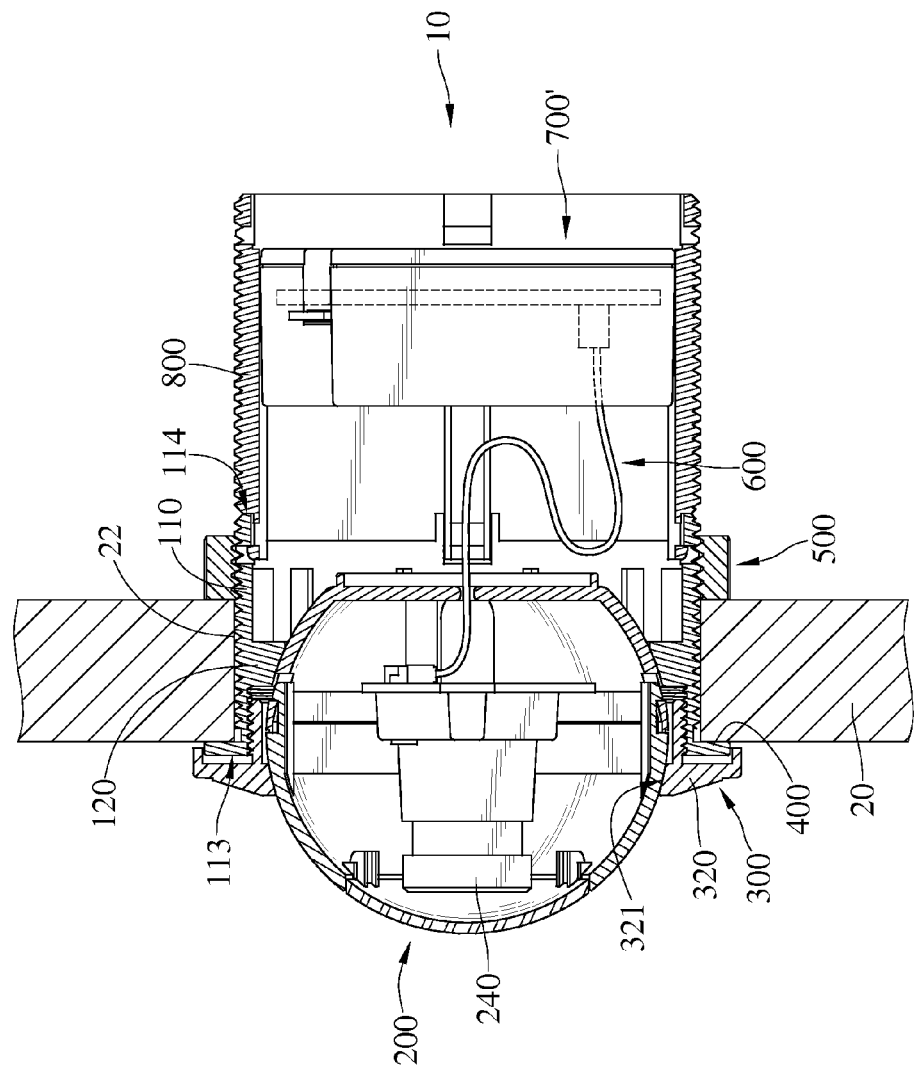
FIG. 8 is a cross-sectional view of a photographing device installed on a rack according to a fourth embodiment.

Please refer to FIG. 8. FIG. 8 is a cross-sectional view of a photographing device installed on a rack according to a fourth embodiment. Since this embodiment is similar to the third embodiment, only the differences will be illustrated. In this embodiment, a camera body 700' of the photographing device 10 is located in an expansion component 800.

The expansion component 800 is installed on the hollow case 110 so that the camera body 700' is hidden behind the image capturing component 200. The image capturing component 200 and the camera body 700' can be electrically connected via the flexible transmission cable 600. Therefore, the image capturing component 200 and the camera body 700' are assembled together and fixed to the thicker rack 20' via the hollow case 110, the expansion component 800, a second annular fastener 500 and a first stopping part 400 whereby it is favorable for further improving the efficiency of assembling the photographing device 10. In this embodiment, the camera body 700' is located in the expansion component 800, but the disclosure is not limited thereto. In some other embodiments, the photographing device 10 does not comprises the expansion component 800, and the hollow case 110 can be lengthened so that both of the image capturing component 200 and the camera body 700' are able to be located in the hollow case 110.

According to the embodiments of the disclosure, an image capturing component of a photographing device is able to be located in in a hollow case conveniently by fastening a first annular fastener and a second annular fastener to the hollow case, and the photographing device is able to be installed on a rack having any thickness. Therefore, it is favorable for efficiently assembling the photographing device.

Furthermore, a lens and an image sensor of the image capturing component are both separated from a camera body so as to miniaturize the image capturing component to decrease a volume of the photographing device exposed to outside, thereby improving the invisibility and the anti-explosiveness of the photographing device.

Moreover, the image capturing component is miniaturized and an orifice of the rack veils the photographing device, thereby further improving the invisibility and the anti-explosiveness of the photographing device.

What is claimed is:

1. A photographing device, comprises:
an assembling component comprising a hollow case, a protruding part, a first fastening part and a second fastening part, wherein the hollow case has an inner surface, a first end and a second end, the first end and the second end are opposite to each other, the protruding part is located at the inner surface so that the protruding part and the inner surface form a supporting space together, the first fastening part is located at the first end of the hollow case, and the second fastening part is located at the second end of the hollow case;

an image capturing component located in the supporting space of the hollow case;

a first annular fastener having a third fastening part and an annular abutting part, wherein the first annular fastener is detachably fastened to the first fastening part via the third fastening part, and the image capturing component is at least partially interposed between the annular abutting part and the protruding part;

a first stopping part connected to the first annular fastener or the first end of the hollow case; and a second annular fastener having a fourth fastening part and a second stopping part, wherein the second annular fastener is detachably fastened to the second fastening part via the fourth fastening part so as to adjust a distance between the first stopping part and the second stopping part.

2. The photographing device according to claim 1, wherein the second stopping part has a sawtooth structure facing towards the first stopping part.

3. The photographing device according to claim 1, wherein the image capturing component comprises a first cover, a second cover, a lens and an image sensor, the first cover is detachably installed on the second cover to form an accommodation space together, the lens is connected to the image sensor, and the image sensor is located in the accommodation space.

4. The photographing device according to claim 3, wherein the first cover has at least one first assembling part, the second cover has at least one second assembling part, and the at least one first assembling part is detachably assembled to the at least one second assembling part.

5. The photographing device according to claim 4, wherein the first cover further has at least one third assembling part, the second cover further has at least one fourth assembling part, the at least one third assembling part is detachably assembled to the at least one fourth assembling part, and a size of the at least one first assembling part and a size of the at least one third assembling part are different.

6. The photographing device according to claim 4, wherein an outer surface of the first cover has an alignment mark.

7. The photographing device according to claim 3, further comprising a light-transmissive lid detachably installed on the first cover, wherein the first cover, the second cover and the light-transmissive lid form the accommodation space together, and both of the lens and the image sensor are located in the accommodation space.

8. The photographing device according to claim 7, wherein the first cover has a hole and at least one fifth assembling part, the at least one fifth assembling part is located in a vicinity of the hole, the light-transmissive lid has at least one sixth assembling part, and the at least one fifth assembling part is detachably assembled to the at least one sixth assembling part.

9. The photographing device according to claim 3, wherein the second cover has an opening connected to the accommodation space.

10. The photographing device according to claim 9, further comprising a camera body and a flexible transmission cable, wherein the flexible transmission cable is electrically connected to the image sensor and the camera body, and the flexible transmission cable passes through the opening.

11. The photographing device according to claim 3, wherein the second cover has a limiting part configured for pressing against the protruding part.

12. The photographing device according to claim 1, wherein the first annular fastener has a side oppositely away from the second annular fastener, and the side has a plurality of ribs.

13. The photographing device according to claim 1, wherein a shape of the image capturing component is spherical, and an inner diameter of the annular abutting part is less than a diameter of the image capturing component.

* * * * *